US011898453B1

(12) United States Patent
Yang et al.

(10) Patent No.: US 11,898,453 B1
(45) Date of Patent: Feb. 13, 2024

(54) METHOD FOR EXTRACTING NATURAL FREQUENCY DIFFERENCE BETWEEN BLADES BY SINGLE BLADE TIP TIMING SENSOR OR UNIFORMLY DISTRIBUTED BLADE TIP TIMING SENSORS

(71) Applicant: XI'AN JIAOTONG UNIVERSITY, Shaanxi (CN)

(72) Inventors: Zhibo Yang, Shaanxi (CN); Jiahui Cao, Shaanxi (CN); Xuefeng Chen, Shaanxi (CN); Zengkun Wang, Shaanxi (CN); Laihao Yang, Shaanxi (CN); Shaohua Tian, Shaanxi (CN); Haoqi Li, Shaanxi (CN); Wenbo Li, Shaanxi (CN)

(73) Assignee: XI'AN JIAOTONG UNIVERSITY, Xi'an (CN)

( * ) Notice: Subject to any disclaimer, the term of this patent is extended or adjusted under 35 U.S.C. 154(b) by 0 days.

(21) Appl. No.: 17/970,361

(22) Filed: Oct. 20, 2022

(51) Int. Cl.
*G01M 15/14* (2006.01)
*F01D 21/00* (2006.01)

(52) U.S. Cl.
CPC ........... *F01D 21/003* (2013.01); *G01M 15/14* (2013.01); *F05D 2260/83* (2013.01); *F05D 2270/304* (2013.01); *F05D 2270/821* (2013.01)

(58) Field of Classification Search
CPC ............... F01D 21/003; F05D 2260/83; F05D 2270/304; F05D 2270/821
See application file for complete search history.

(56) References Cited

U.S. PATENT DOCUMENTS

2021/0278312 A1* 9/2021 Qiao ..................... G01H 1/003
2021/0389207 A1* 12/2021 Qiao ..................... G01M 15/14

* cited by examiner

*Primary Examiner* — Eric S. McCall

(57) ABSTRACT

The present disclosure discloses a method for extracting a natural frequency difference between blades by a single blade tip timing sensor or uniformly distributed blade tip timing sensors. The method includes the following steps: acquiring actual arrival time of a rotating blade by using a single blade tip timing sensor or uniformly distributed blade tip timing sensors, and converting a difference between theoretical arrival time and the actual arrival time into displacement data of a blade tip according to a rotational speed and a blade length of the rotating blade; selecting displacement data of blade tips of two rotating blades with the same blade length at the same rotational speed; intercepting the displacement data, performing discrete Fourier transform respectively, and making a sampling frequency approximate to an average rotational speed to obtain spectrum data.

6 Claims, 9 Drawing Sheets

METHOD FOR EXTRACTING NATURAL FREQUENCY DIFFERENCE BETWEEN BLADES BY SINGLE BLADE TIP TIMING SENSOR OR UNIFORMLY DISTRIBUTED BLADE TIP TIMING SENSORS

FIELD

The present disclosure belongs to the field of non-contact non-destructive detection of blades, and particularly relates to a method for extracting a natural frequency difference between blades by a single blade tip timing sensor or uniformly distributed blade tip timing sensors.

BACKGROUND

A rotor blade is a key part of large devices such as a gas turbine and an aeroengine, often rotates at a high speed under the conditions of high temperature and high pressure, and bears a centrifugal force, an aerodynamic force and other cyclic alternating loads as well as dynamic loads. The rotor blade has very complicated working state and structural behavior, and is prone to vibration. Statistic data indicates that blade damage accidents account for about one third of the total structural faults of the gas turbine, so that it is necessary to detect the faults of the rotor blade. However, the traditional contact blade vibration measurement detection method, such as a strain gauge measurement method, requires shutdown, and it is difficult to monitor the vibration situations of all blades. Whereas, the blades are in a long-term working state, if detection only can be performed in the shutdown state, the use of the device will be delayed, and the blades cannot be monitored in the working process of the device, causing potential safety hazards. Therefore, a more reasonable monitoring method is required. Blade tip timing (BTT) is a method for performing non-contact online measurement on the vibration of a rotating blade. A blade tip timing sensor is embedded into a stationary casing near the blade to realize non-contact online measurement on vibration, but a blade tip timing sampling rate is related to a rotational speed and a number of sensors, and the blade tip timing data has an excessive undersampling characteristic due to the limited mounting positions of the sensors in actual situations. In actual use of the blade tip timing measurement method, a plurality of blade tip timing sensors are often used to alleviate the aliasing influence caused by undersampling, but the installation of the plurality of blade tip timing sensors in the actually limited space will cause great trouble and also increase the measurement cost. When traditional methods, such as compressed sensing, subspace method and least squares iteration, are used to perform modal parameter identification on uniformly distributed and non-uniformly distributed data of the blade tip timing sensors, on one hand, these algorithms involve a large number of operations, so online real-time detection and diagnosis cannot be realized; and on the other hand, these algorithms directly identify the natural frequency and other parameters of a single blade, resulting in a large error. Therefore, it is very important to improve the blade tip timing measurement method and the modal parameter identifying method.

The above information disclosed in the background segment is only used to enhance the understanding of the background of the present disclosure, and therefore may include information which does not constitute the prior art well known to those of ordinary skill in the art in China.

SUMMARY

For the problems in the prior art, the present disclosure provides a method for extracting a natural frequency difference between blades by a single blade tip timing sensor or uniformly distributed blade tip timing sensors, thereby identifying the health state of the blades more rapidly and accurately.

An objective of the present disclosure is achieved by the following technical solution. A method for extracting a natural frequency difference between blades by a single blade tip timing sensor or uniformly distributed blade tip timing sensors includes the following steps:

- a first step: acquiring actual arrival time of a rotating blade by using a single blade tip timing sensor or uniformly distributed blade tip timing sensors, and converting a difference between theoretical arrival time and the actual arrival time into displacement data of a blade tip according to a rotational speed and a blade length of the rotating blade;
- second step: selecting displacement data of blade tips of two rotating blades with the same blade length at the same rotational speed;
- third step: intercepting the displacement data, performing discrete Fourier transform respectively, and making a sampling frequency approximate to an average rotational speed to obtain spectrum data; and
- a fourth step: respectively extracting, from the spectrum data, frequency remainders corresponding to the aliased natural frequencies of the two blades, and performing subtraction on the two frequency remainders to obtain the natural frequency difference between the two blades.

According to the method, in the first step, the single blade tip timing sensor collects the arrival time t of each blade, and a difference between theoretical arrival time and actual arrival time is converted into a blade tip displacement according to the rotational speed $f_r$, and the blade length R of the blade, and an expression is as follows: $x(t_{i,j})=2\pi R\cdot f_r\cdot(t_{i,j}-\bar{t}_{i,j})$, where $t_{i,j}$ represents the actual arrival time of an i-th blade at a j-th turn; $\bar{t}_{i,j}$ represents the S theoretical arrival time, $$\bar{t}_{i,j}=\frac{60\cdot(\theta_i+a_k)}{2\pi n},$$

where $\theta_i$ represents an angle of the i-th blade based on amounting position of a rotational speed sensor, $\alpha_k$ represents an angle of a k-th sensor based on the mounting position of the rotational speed sensor, n is the rotational speed, and $x(t_{i,j})$ represents the displacement of the i-th blade at the j-th turn and at time $t_{i,j}$.

Displacement data obtained by the uniformly distributed glade tip timing sensors is displacement data obtained by several single sensors respectively, which is fused according to an order in which the blades pass the sensors.

$$x(n_p\cdot k+c_i)=x_i(k)\ i=1,2,\ \ldots\ ,n_p,$$

where $x(\bullet)$ is the displacement data fused from the data obtained by the plurality of sensors, k represents a number of turns, and $x_i(k)$ represents a displacement value obtained by calculation when the blade passes the i-th sensor at the k-th turn. The specific calculation method has been described in the above single sensor. j represents that for the blade, when the blade rotates a turn about an initial position, the i-th sensor is the $c_i$-th sensor that the blade passes.

In the method, the rotating process of the blade is an acceleration or deceleration process of a predetermined acceleration or a constant speed process; and in the rotating process, gas nozzles distributed uniformly in a circumferential direction are used to simulate gas excitation.

In the method, for the acceleration or deceleration process, displacement data for a displacement sequence number interval near a formant of one displacement of two blade displacements is selected, displacement data for the same displacement sequence number interval of the other blade displacement is selected, and the sampling frequency $f_s$ is approximately equal to the average rotational speed $$f_s \approx \frac{n_p}{N_2 - N_1 + 1} \sum_{i=N_1}^{N_2} f_{ri}.$$

Interception may be arbitrary: for example, for displacement vectors $L_1$,$L_2$ with the lengths being M, an index range [N1,N2] is selected, that is, data in the index range [N1,N2] of $L_1$,$L_2$ is intercepted. However, it is necessary to meet that $L_1$,$L_2$ are displacements of two blades measured in the same test. In addition, it should be noted that the range of [$N_1$,N2] is optionally determined, and does not need to be excessively long if the data is obtained by measurement at variable speeds. There will be a patent for describing how to intercept data to achieve a better effect.

According to the method, in the third step, the intercepted two segments of discrete displacement data are subjected to discrete Fourier transform to obtain the spectrum data, $$X(k) = \sum_{n=0}^{N-1} x(n)\cos\left(\frac{2\pi kn}{N}\right) - i\sum_{n=0}^{N-1} x(n)\sin\left(\frac{2\pi kn}{N}\right),$$

where x (n) is a signal obtained by sampling, i is an imaginary number symbol, $i=\sqrt{-1}$, N is a length of an acquired signal, x is a number of elements, n is an iteration number, traversing is performed from 0 to N−1, that is, all elements in x are taken, k is an integer from 0 to N−1, and X(k) represents the k-th data after discrete Fourier transform.

According to the method, in the fourth step, since the sampling frequency is equal to the rotational speed frequency, according to analysis on the aliasing situation of a rotational frequency and a multiplied frequency thereof, an under sampled spectrum is obtained by performing discrete Fourier transform on the original signal sequence, the frequency appears near a zero frequency in the under sampled spectrum, the frequency in the under sampled spectrum after blade vibration frequencies are aliased is extracted after a rotational speed frequency component is excluded, a frequency component with a maximum amplitude is extracted from the under sampled spectrum and is referred to as a frequency remainder $f^{sub}$, the natural frequency difference $\Delta f=f_2^{sub}-f_1^{sub}$, $f_2^{sub}$, $f_1^{sub}$ respectively refer to frequency remainders of a blade 2 and a blade 1.

According to the method provided by the present disclosure, the natural frequency difference between different blades can be extracted from the excessively under sampled data only by using the single blade tip timing sensor or the uniformly distributed blade tip timing sensors, without additional signal reconstruction and more blade tip timing sensors, so that the method is rapid and stable to operate, simple and feasible, and capable of realizing real-time health monitoring of the rotating blades.

The above description is merely an overview of the technical solution of the present disclosure. To make the technical means of the present disclosure more comprehensible to be implemented by those skilled in the art in accordance with the content of the description and to make the above and other objectives, features and advantages of the present disclosure more obvious and understandable, the specific implementations of the present disclosure are illustrated below.

BRIEF DESCRIPTION OF THE DRAWINGS

Various advantages and benefits become apparent to those of ordinary skill in the art upon reading detailed description of the following preferred specific implementations. The accompanying drawings are merely used to show the preferred implementations, and are not considered as limitations to the present disclosure. Apparently, the accompanying drawings described below are merely some embodiments of the present disclosure, and those of ordinary skill in the art may still derive other drawings from these accompanying drawings without creative efforts. In addition, in all of the accompanying drawings, the same parts are represented by the same reference numerals.

In the accompanying drawings.

Figure 1:
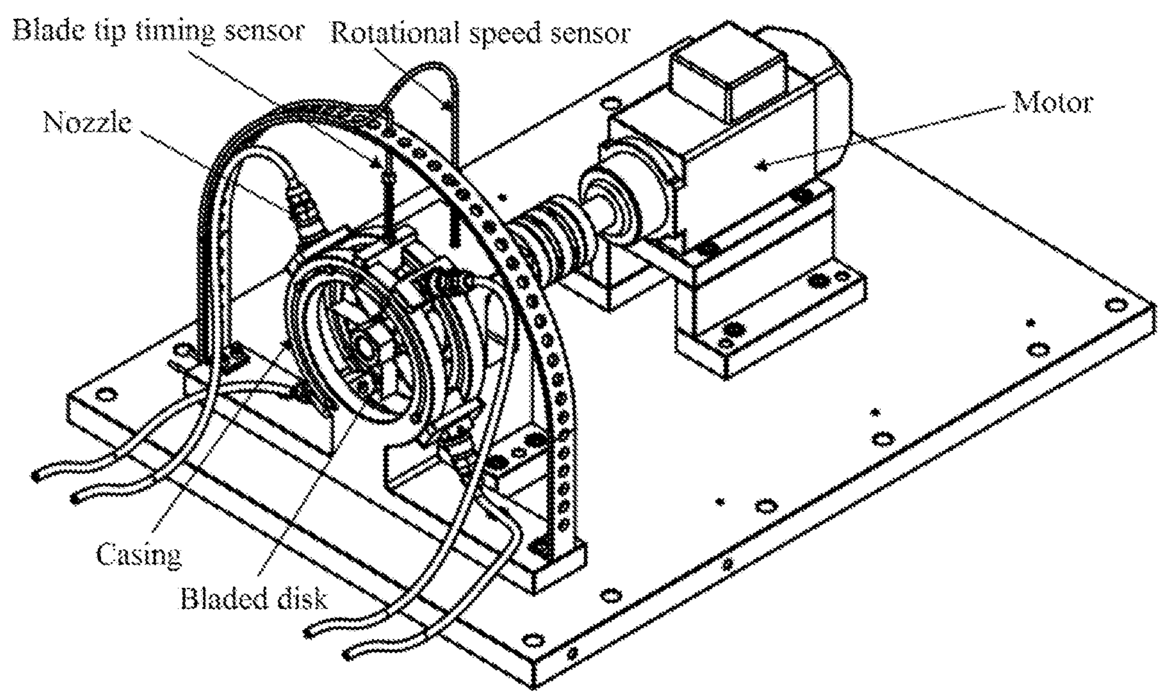
FIG. 1 is a test diagram showing measurement of a blade tip displacement of a rotating blade by a blade tip timing sensor.

The present disclosure is further described below with reference to the accompanying drawings and embodiments.

DETAILED DESCRIPTION OF THE EMBODIMENTS

The specific embodiments of the present disclosure will be described in detail below with reference to FIG. 1 to FIG. 9. Although the accompanying drawings show the specific embodiments of the present disclosure, it should be understood that the present disclosure may be implemented in various forms and shall not be limited by the embodiments described herein. On the contrary, these embodiments are provided to provide a more thorough understanding of the present disclosure, and the scope of the present disclosure can be fully conveyed to those skilled in the art.

It should be noted that some terms are used in the description and the claims to refer to specific components. It should be understood by those skilled in the art that technicians may use different names to refer to the same component. The description and the claims do not use the difference in names as a way of distinguishing components, but use the difference in functions as a criterion for distinguishing the components. The word "comprise" or "include" as used throughout the description and claims is an open term and should be interpreted as "including but not limited to". The subsequent description of the description is about preferred implementation of the present disclosure. However, the description is for the purpose of the general principle of the description, and is not intended to limit the scope of the present disclosure. The protection scope of the present disclosure is defined by the appended claims.

In order to facilitate the understanding of the embodiments of the present disclosure, the specific embodiments will be taken as examples for further explanation and description in combination with the accompanying drawings, and the drawings do not constitute a limitation to the embodiments of the present disclosure.

A method for extracting a natural frequency difference between blades by a single blade tip timing sensor or uniformly distributed blade tip timing sensors includes the following steps.

(1) Arrival time of a rotating blade is acquired by using one blade tip timing sensor or uniformly distributed timing sensors, and a difference between theoretical arrival time and actual arrival time is converted into a blade tip displacement according to a rotational speed and a blade length.

In this exemplary example, signals acquired by the single blade tip timing sensor and signals acquired by two uniformly distributed timing sensors are analyzed respectively. Specifically, a single optical fiber blade tip timing sensor and two uniformly distributed optical fiber blade tip timing sensors are fixed on a casing, an initial rotational speed is set to 60 Hz, an acceleration of a rotational speed is set to 0.5 Hz/s, and a change range of the rotational speed is 60 Hz-100 Hz-60 Hz, wherein the time for the 100 Hz constant speed segment is 20 seconds. A bladed disk adopts an eight-blade integrated aluminum alloy bladed disk, wherein the radius of the bladed disk is R=68 mm, the thickness of the blade is d=1 mm, and the width of the blade is w=20 mm. Four nozzles are uniformly distributed on the casing to spray 0.5 Mpa high-pressure gas. The arrival time of the rotating blade is acquired by the single blade tip timing sensor and the two uniformly distributed blade tip timing sensors respectively, and a difference between theoretical arrival time and actual arrival time is converted into a blade tip displacement according to the rotational speed and the length of the blade.

(2) Two segments of displacement data of two blades to be analyzed at the approximately same rotational speed are selected. If slow acceleration or deceleration data is selected, the intercepted data is inadvisable to be too long, so that the requirement of an approximately constant sampling frequency is met.

Figure 2:
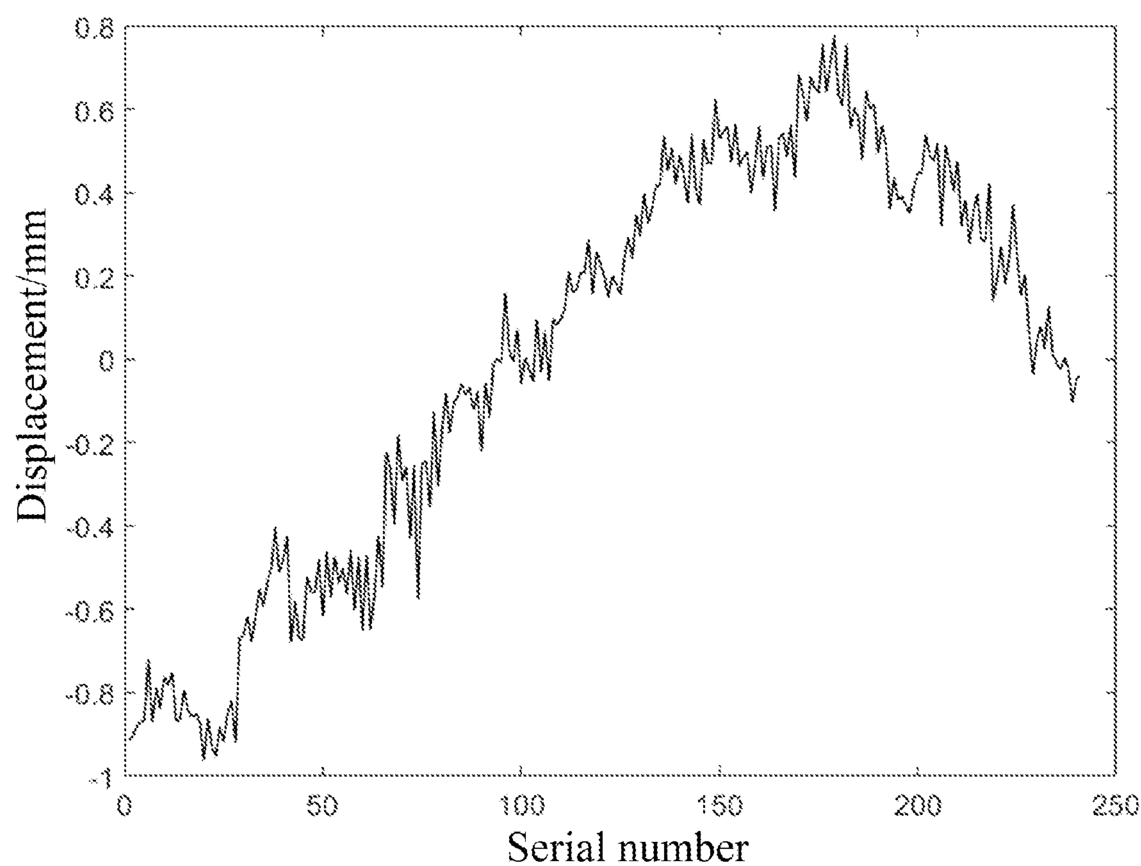
FIG. 2 is a diagram showing displacement after intercepted displacement data of a blade 1 is de-averaged when a single blade tip timing sensor is used.
Figure 3:
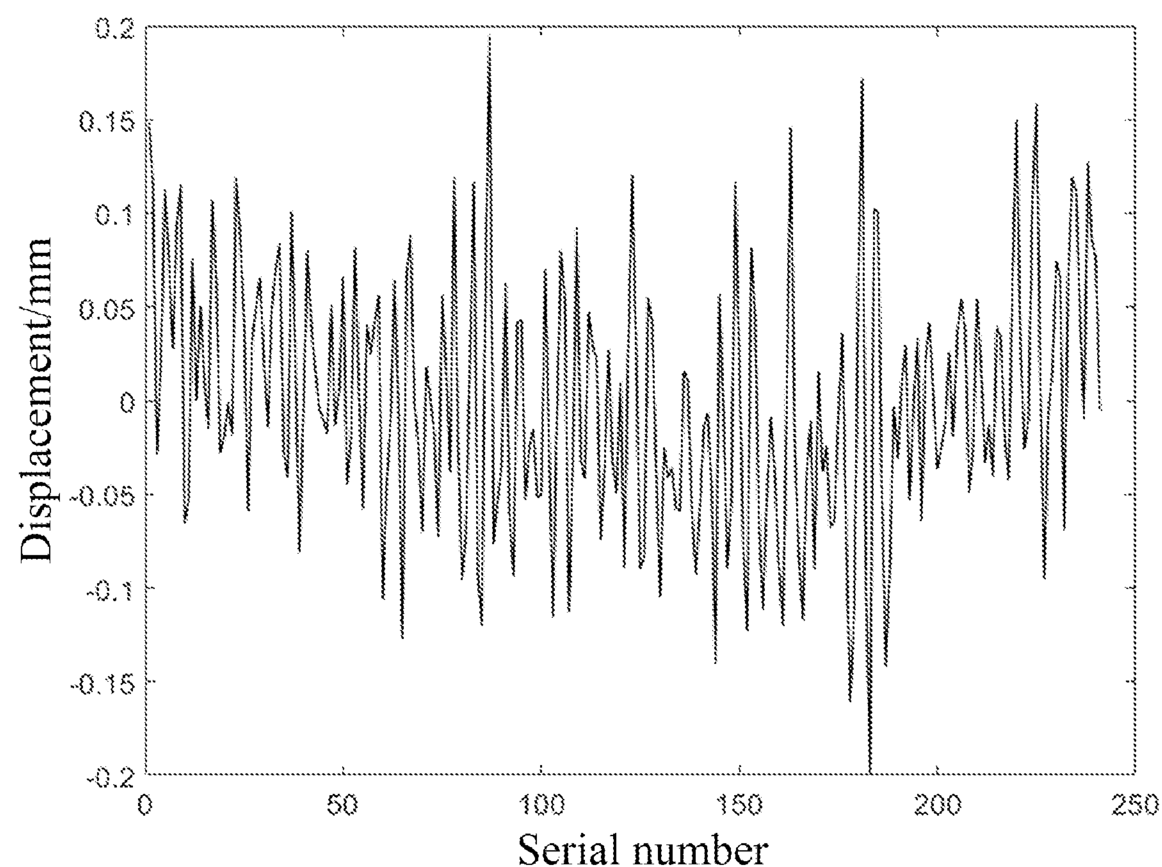
FIG. 3 is a diagram showing displacement after intercepted displacement data of a blade 5 is de-averaged when a single blade tip timing sensor is used.
Figure 6:
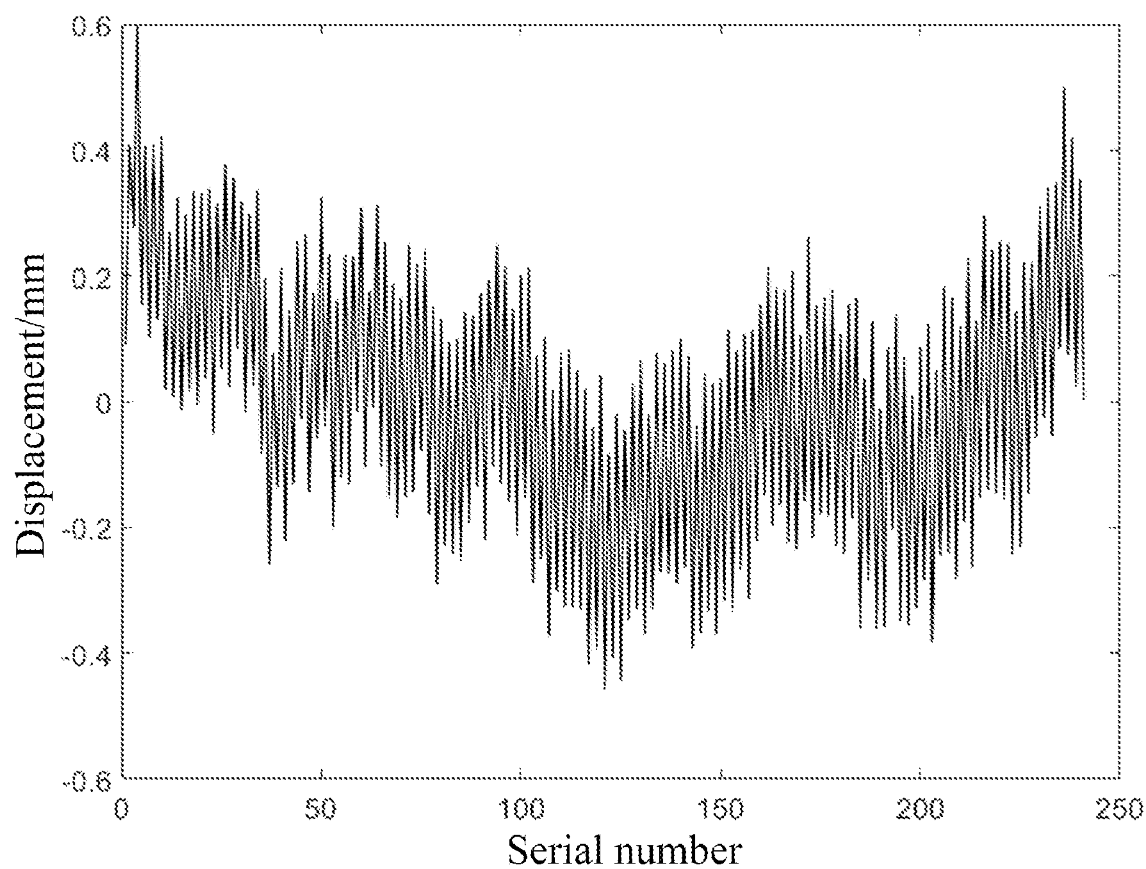
FIG. 6 is a diagram showing displacement after intercepted displacement data of a blade 1 is de-averaged when two uniformly distributed blade tip timing sensors are used.
Figure 7:
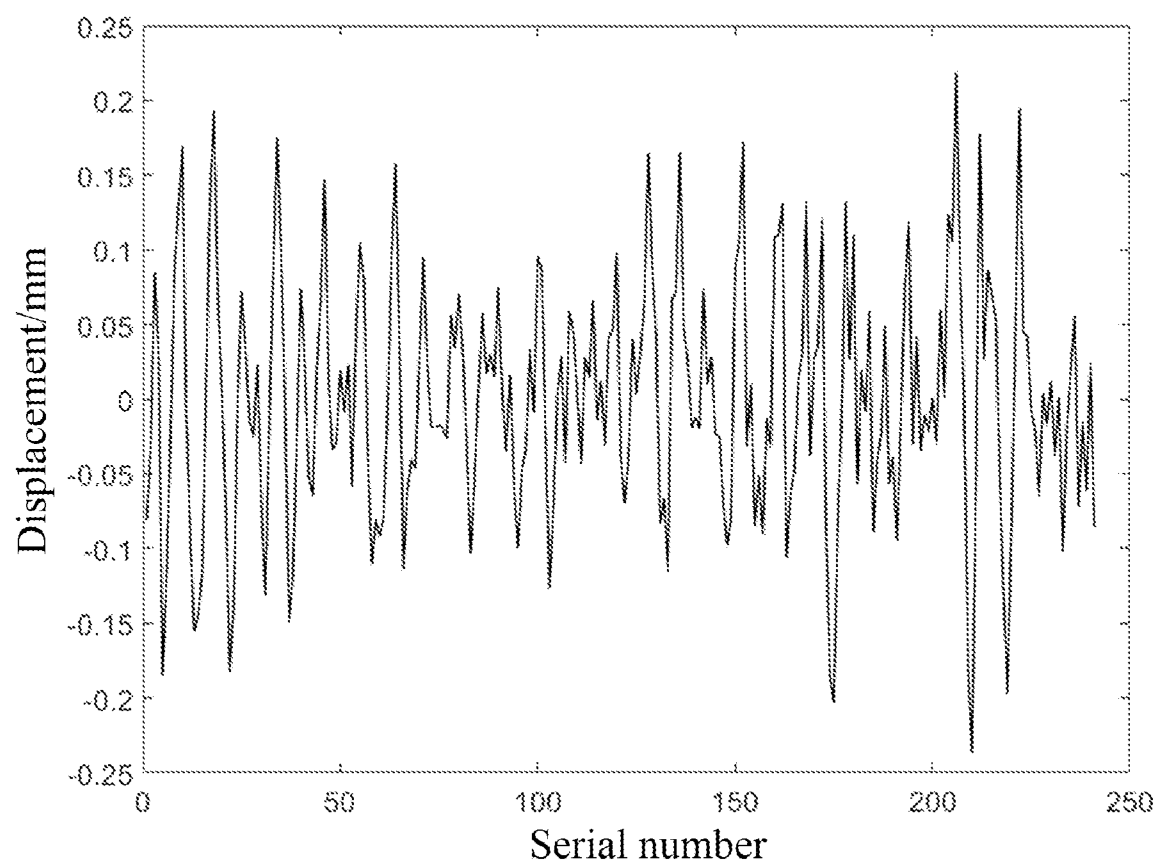
FIG. 7 is a diagram showing displacement after intercepted displacement data of a blade 5 is de-averaged when two uniformly distributed blade tip timing sensors are used.

In this exemplary example, specifically, displacement data of a blade 1 and a blade 5 is selected. For the displacement data acquired by the single blade tip timing sensor, a position serial number range of the intercepted data is [4719,4959], a change range of the corresponding rotational speed is: 84.66 Hz~85.59 Hz, an approximately sampling frequency is $f_s^1$=85.125 Hz, and the diagrams showing displacements after the intercepted displacement data of the blade 1 and the blade 5 is de-averaged are as shown in FIG. 2 and FIG. 3. For the displacement data acquired by the two uniformly distributed blade tip timing sensors, a position serial number range of the intercepted data is [9611,9851], a change range of the corresponding rotational speed is: 84.95 Hz~85.54 Hz, an approximately sampling frequency is $f_s^2$=170.49 Hz, and the diagrams showing displacements after the intercepted displacement data of the blade 1 and the blade 5 is de-averaged are as shown in FIG. 6 and FIG. 7.

(3) The two segments of intercepted data are subjected to discrete Fourier transform respectively, and a sampling frequency is approximate to an average rotational speed to obtain spectrum data.

In this exemplary example, a calculation formula of discrete Fourier transform is:

$$X(k)=\sum_{n=0}^{N-1}x(n)\cos\left(\frac{2\pi kn}{N}\right)-i\sum_{n=0}^{N-1}x(n)\sin\left(\frac{2\pi kn}{N}\right), \tag{6}$$

where x(n) is a signal obtained by sampling, i is an imaginary number symbol, $i=\sqrt{-1}$, N is a length of an acquired signal, x is a number of elements, n is an iteration number, traversing is performed from 0 to N−1, that is, all elements in x are taken, k is an integer from 0 to N−1, and X(k) represents the k-th data after discrete Fourier transform.

(4) Frequency remainders corresponding to the aliased natural frequencies of two blades are extracted from the spectrum data, and subtraction is performed on the two frequency remainders to obtain a natural frequency difference between the two blades.

In this exemplary example, the following steps are specifically included:

a) the above spectrum data is analyzed to draw an amplitude frequency curve; and
b) a rotational speed frequency component is excluded, a rotational frequency and a multiplied frequency thereof are present in a signal besides a blade vibration frequency component, the sampling frequency is equal to the rotational frequency, according to analysis on the aliasing situation of the rotational frequency and the multiplied frequency thereof, the frequency appears near a zero frequency in the under sampled spectrum, and after the rotational speed frequency component is excluded, the frequency in the under sampled spectrum after blade vibration frequencies are aliased is extracted, which is hereinafter referred to as a frequency remainder $f^{sub}$.

$$\Delta f^{sub}=f_5^{sub}-f_1^{sub} \tag{7}$$

For the two blades meeting the condition of $\Delta f<f_s/2$, $\Delta f=\Delta f^{sub}$ may be directly obtained.

Application Example

According to this instance, signals acquired by a single blade tip timing sensor and signals acquired by two uniformly distributed blade tip timing sensors are analyzed respectively, a natural frequency difference between blades is extracted by the method provided by the present disclosure, thereby describing that the method provided by the present disclosure uses a mode of acquisition by a single blade tip timing sensor and a mode of acquisition by uniformly distributed blade tip timing sensors.

On a blade tip timing testbed as shown in FIG. 1, a single optical fiber blade tip timing sensor and two uniformly distributed optical fiber blade tip timing sensors are fixed on a casing, an initial rotational speed is set to 60 Hz, an acceleration of a rotational speed is set to 0.5 Hz/s, and a change range of the rotational speed is 60 Hz-100 Hz-60 Hz, wherein the time for the 100 Hz constant speed segment is 20 seconds. A bladed disk adopts an eight-blade integrated aluminum alloy bladed disk, wherein the radius of the bladed disk is R=68 mm, the thickness of the blade is d=1 mm, and the width of the blade is w=20 mm. Four nozzles are uniformly distributed on the casing to spray 0.5 Mpa high-pressure gas. The arrival time of the rotating blade is acquired by the single blade tip timing sensor and the two uniformly distributed blade tip timing sensors respectively, and a difference between theoretical arrival time and actual arrival time is converted into a blade tip displacement according to the rotational speed and the length of the blade.

Specifically, displacement data of a blade 1 and a blade 5 is selected. For the displacement data acquired by the single blade tip timing sensor, a position serial number range of the intercepted data is [4719,4959], a change range of the corresponding rotational speed is: 84.66 Hz~85.59 Hz, an approximately sampling frequency is $f_s^1$=85.125 Hz, and the schematic diagrams of the intercepted displacement data of the blade 1 and the blade 5 after de-averaging are as shown in FIG. 2 and FIG. 3. For the displacement data acquired by the two uniformly distributed blade tip timing sensors, a position serial number range of the intercepted data is [9611,9851], a change range of the corresponding rotational speed is: 84.95 Hz~85.54 Hz, an approximately sampling frequency is $f_s^2$=170.49 Hz, and the schematic diagrams of the intercepted displacement data of the blade 1 and the blade 5 after de-averaging are as shown in FIG. 6 and FIG. 7. The intercepted two segments of data are subjected to discrete Fourier transform respectively, and a sampling frequency is approximate to an average rotational speed to obtain amplitude frequency diagrams of the intercepted segments of data of the blade 1 and the blade 5, wherein the amplitude frequency diagrams of the displacement data of the blade 1 and the blade 5 obtained by the single blade tip timing sensor are as shown in FIG. 4 and FIG. 5 respectively, and the amplitude frequency diagrams of the displacement data of the blade 1 and the blade 5 obtained by the two uniformly distributed blade tip timing sensors are as shown in FIG. 8 and FIG. 9 respectively.

Figure 4:
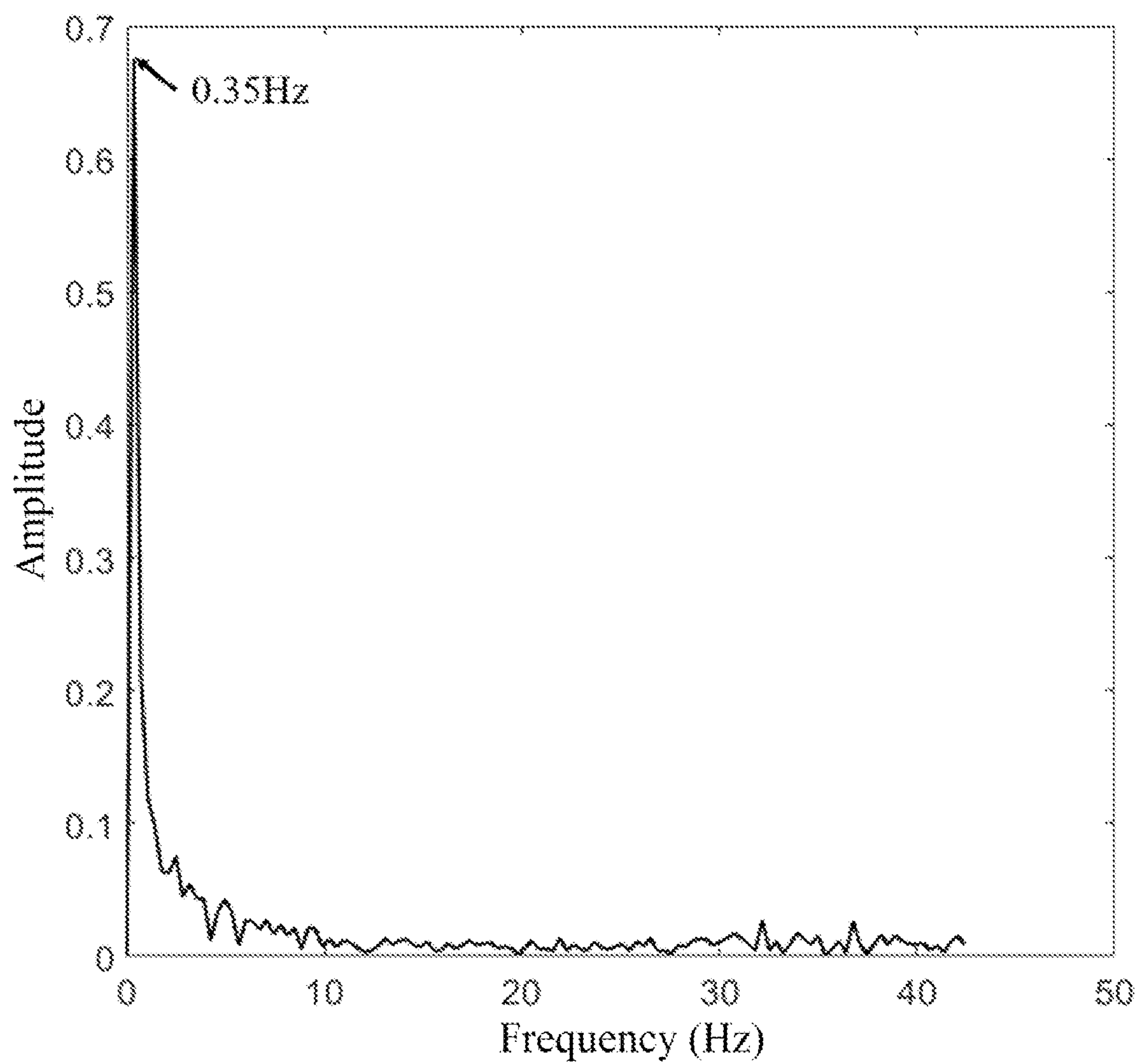
FIG. 4 is a DFT analysis amplitude frequency diagram of an under sampled signal of a blade 1 when a single blade tip timing sensor is used.
Figure 5:
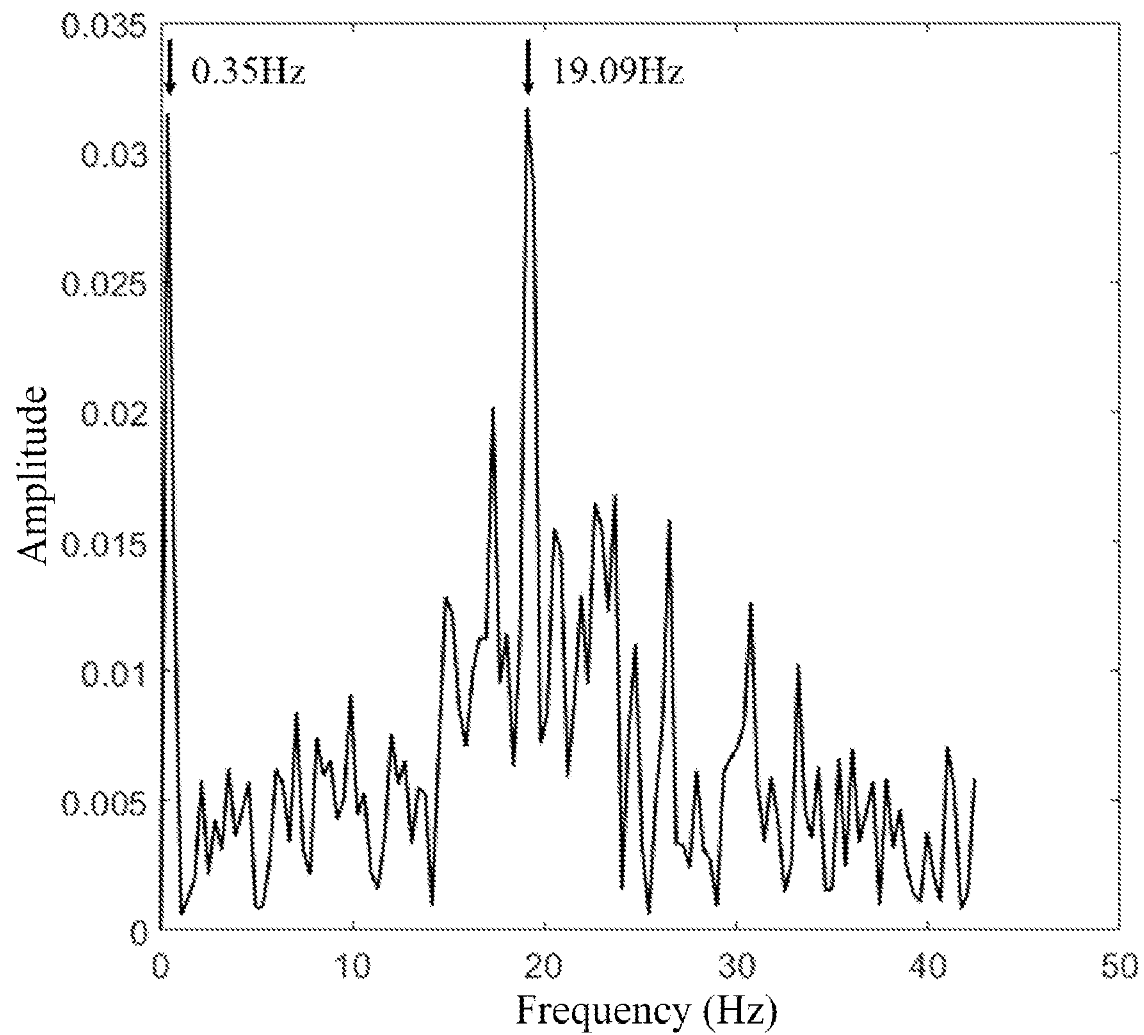
FIG. 5 is a DFT analysis amplitude frequency diagram of an under sampled signal of a blade 5 when a single blade tip timing sensor is used.

Firstly, the amplitude frequency diagrams, i.e., FIG. 4 and FIG. 5, of the data obtained by the single blade tip timing sensor are analyzed. According to the analysis on the amplitude frequency diagram of the blade 1, synchronous resonance of the blade 1 occurs at the intercepted segments of data, and the natural frequency is equal to the multiplied frequency of the rotational speed. At the moment, the component of the aliased natural frequency and the component of the aliased rotational speed frequency overlap with each other and are at 0.35 Hz near the zero frequency, so $f_1^{sub}$=0.35 Hz. At the moment, the frequency component includes component energy of the blade vibration natural frequency and component energy of the rotational frequency and the multiplied frequency thereof, so that the amplitude is high and is 0.68. According to the analysis on the amplitude frequency diagram of the blade 5, asynchronous vibration of the intercepted segments of data of the blade 5 occurs, and the under sampled spectrum includes a frequency component after the rotational frequency and the multiplied frequency thereof are aliased, and a frequency component after the natural frequency of the blade 5 is aliased. In combination with the amplitude frequency diagram of the blade 1, the 0.35 frequency component is a frequency component after the rotational frequency and the multiplied frequency thereof are aliased, and the amplitude is 0.33; and the 19.09 Hz frequency component is a frequency component after the natural frequency of the blade 5 is aliased, the amplitude is 0.34 Hz; and the sum of the amplitudes is 0.67 and is close to 0.68 of the blade 1, indicating that the analysis result is reliable, so $f_5^{sub}$=19.09 Hz.

Figure 8:
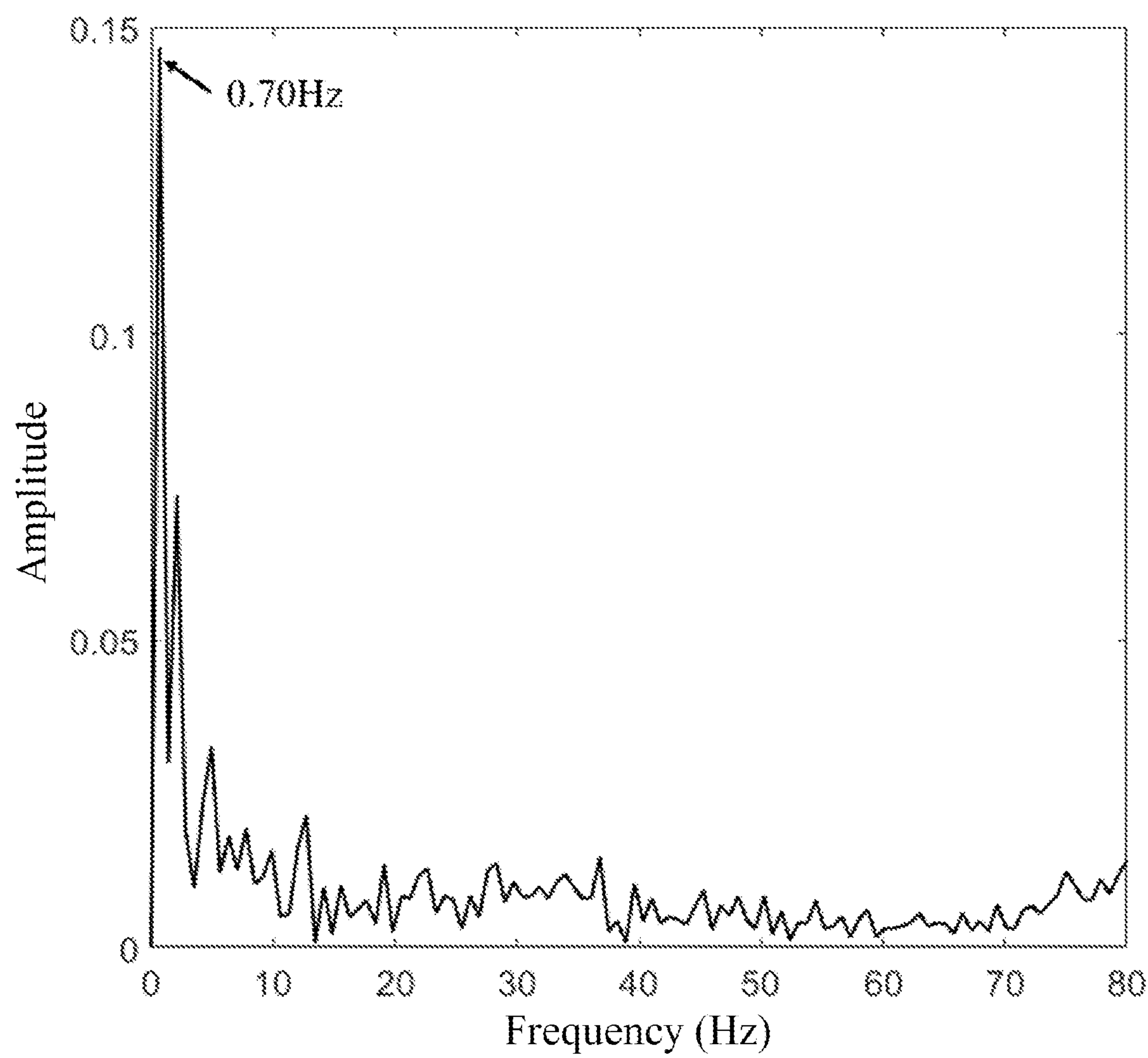
FIG. 8 is a DFT analysis amplitude frequency diagram of an under sampled signal of a blade 1 when two uniformly distributed blade tip timing sensors are used.
Figure 9:
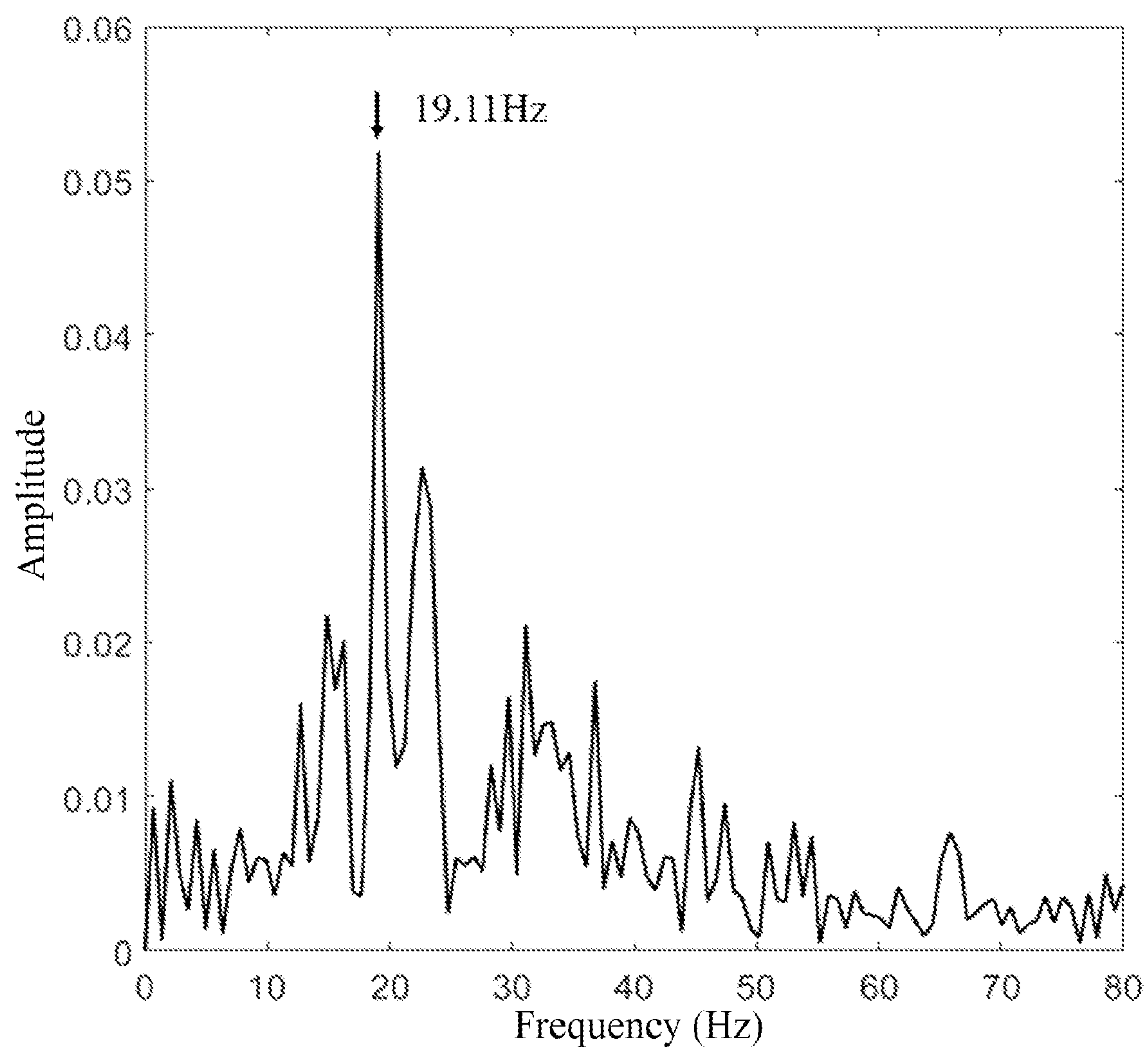
FIG. 9 is a DFT analysis amplitude frequency diagram of an under sampled signal of a blade 5 when two uniformly distributed blade tip timing sensors are used.

Then, the amplitude frequency diagrams, i.e., FIG. 8 and FIG. 9, of the data obtained by the two uniformly distributed blade tip timing sensors are analyzed, wherein according to the analysis on the amplitude frequency diagram of the blade 1, the frequency remainder of the blade 1 is $f_1^{sub}$=0.70 Hz; and according to the analysis on the amplitude frequency diagram of the blade 5, the frequency remainder of the blade 5 is $f_5^{sub}$=19.11 Hz.

According to the analysis of a modal test, first-order natural frequencies of the blade land a blade 2 of the aluminum alloy bladed disk are 341 Hz and 361 Hz respectively, a natural frequency difference is 20 Hz, the natural frequency between actual blades will not be too large, the sampling frequency of the selected segment of data is $f_s$=85.125 Hz, and the condition of $\Delta f<f_s/2$ is obviously met. Therefore, at the moment, by the method for extracting the natural frequency difference between the blades via the single blade tip timing sensor according to the frequency remainder provided by the present disclosure, the frequency difference $\Delta f=\Delta f^{sub}$ between the blade 1 and the blade 5 may be obtained. Further, the frequency difference between the blade 1 and the blade 5 obtained from data analysis of the single blade tip timing sensor may be calculated to be $\Delta f^{sub}=f_5^{sub}-f_1^{sub}$=19.09−0.35=18.74 Hz, so $\Delta f$=18.74 Hz may be obtained. The frequency difference between the blade 1 and the blade 5 obtained from data analysis of the two uniformly distributed blade tip timing sensors is $\Delta f^{sub}=f_5^{sub}-f_1^{sub}$=19.11−0.70=18.41 Hz. The natural frequency differences between the blade 1 and the blade 5 obtained by the layout of the single sensor and the layout of the two uniformly distributed sensors are very close to each other, and the difference is only 0.33 Hz.

The natural frequency of the rotating blade is measured by a strain gauge and an electrically conductive slip ring, and the obtained natural frequency difference between the blade 1 and the blade 5 is 19 Hz.

The natural frequency differences measured by the method provided by the present disclosure are 18.74 Hz and 18.41 Hz, which are very close to the test measurement value 19 Hz, and the difference is only within 1 Hz. Furthermore, the method does not involve complicated operation and only needs to perform discrete Fourier transform change analysis on two small groups of data, so that the method is rapid and stable in operation, simple and feasible, and capable of realizing real-time health monitoring of the rotating blades.

Although the embodiments of the present disclosure are described above in combination with the accompanying drawings, the present disclosure is not limited to the above specific embodiments and application field, and the above specific embodiments are only illustrative and instructive, rather than being restrictive. Those of ordinary skills in the art can make various forms under the inspiration of this description and without departing from the protection scope of the claims of the present disclosure, which all fall within the protection scope of the present disclosure.

What is claimed is:

1. A method for extracting a natural frequency difference between blades by a single blade tip timing sensor or uniformly distributed blade tip timing sensors, comprising the following steps:

a first step (S1): acquiring actual arrival time of a rotating blade by using a single blade tip timing sensor or uniformly distributed blade tip timing sensors, and converting a difference between theoretical arrival time and the actual arrival time into displacement data of a blade tip according to a rotational speed and a blade length of the rotating blade;

a second step (S2): selecting displacement data of blade tips of two rotating blades with the same blade length at the same rotational speed;

a third step (S3): intercepting the displacement data, performing discrete Fourier transform respectively, with a sampling frequency approximate to an average rotational speed, to obtain spectrum data; and a fourth step (S4): respectively extracting, from the spectrum data, frequency remainders corresponding to the aliased natural frequencies of the two blades, and performing subtraction on the two frequency remainders to obtain the natural frequency difference between the two blades.

2. The method according to claim 1, wherein in the first step (S1), the single blade tip timing sensor collects the arrival time t of each blade, and a difference between theoretical arrival time and the actual arrival time is converted into a blade tip displacement according to the rotational speed $f_r$ and the blade length R of the blade, and an expression is as follows: $x(t_{i,j})=2\pi R\cdot f_r\cdot(t_{i,j}-\bar{t}_{i,j})$, where $t_{i,j}$ represents the actual arrival time of an i-th blade at a j-th turn; $\bar{t}_{i,j}$ represents the theoretical arrival time, $$\bar{t}_{i,j} = \frac{60\cdot(\theta_i + a_k)}{2\pi n},$$

where $\theta_i$ represents an angle of the i-th blade based on amounting position of a rotational speed sensor, $\alpha_k$ represents an angle of a k-th sensor based on the mounting position of the rotational speed sensor, n is the rotational speed, and $x(t_{i,j})$ represents the displacement of the $i^{th}$ blade at the j-th turn and at time $t_{i,j}$.

3. The method according to claim 2, wherein the rotating process of the blade is an acceleration or deceleration process of a predetermined acceleration or a constant speed process; and in the rotating process, gas nozzles distributed uniformly in a circumferential direction are used to simulate gas excitation.

4. The method according to claim 3, wherein for the acceleration or deceleration process, displacement data for a displacement sequence number interval near a formant of one displacement of two blade displacements is selected, displacement data for the same displacement sequence number interval of the other blade displacement is selected, and the sampling frequency $f_s$ is approximately equal to the average rotational speed, $$f_s \approx \frac{n_p}{N_2 - N_1 + 1}\sum_{i=N_1}^{N_2} f_{ri},$$

where $n_p$ represents the number of the sensors, $N_1$ and $N_2$ respectively represent intercepted data indexes, and $f_{ri}$ represents the rotational speed of i-th data at sampling time.

5. The method according to claim 1, wherein in the third step (S3), the intercepted two segments of discrete displacement data are subjected to discrete Fourier transform to obtain the spectrum data, $$X(k) = \sum_{n=0}^{N-1} x(n)\cos\left(\frac{2\pi kn}{N}\right) - i\sum_{n=0}^{N-1} x(n)\sin\left(\frac{2\pi kn}{N}\right),$$

where x(n) is a signal obtained by sampling, i is an imaginary number symbol, $i=\sqrt{-1}$, N is a length of an acquired signal, x is the number of elements, n is an iteration number, traversing is performed from 0 to N−1, that is, all elements in x are taken, k is an integer from 0 to N−1, and X(k) represents $k^{th}$ data after discrete Fourier transform.

6. The method according to claim 5, wherein in the fourth step (S4), since the sampling frequency is equal to rotational speed frequency, according to analysis on the aliasing situation of rotational frequency and multiplied frequency thereof, an under sampled spectrum is obtained by performing discrete Fourier transform on the original signal sequence, the frequency appears near the zero frequency in the under sampled spectrum, the frequency in the under sampled spectrum after blade vibration frequencies are aliased is extracted after a rotational speed frequency component is excluded, a frequency component with the maximum amplitude is extracted from the under sampled spectrum and is referred to as a frequency remainder $f^{sub}$, the natural frequency difference $\Delta f=f_2^{sub}-f_1^{sub}$, and $f_2^{sub}$, $f_1^{sub}$ respectively refer to the frequency remainders of a blade 2 and a blade 1.

* * * * *